Dec. 10, 1963 J. M. TRACY ETAL 3,113,355
LOUVERED SUN SHIELD
Filed Feb. 24, 1961 3 Sheets-Sheet 1

John M. Tracy,
William R. Tracy,
Inventors.
Koenig, Pope, Senniger and Powers,
Attorneys.

Dec. 10, 1963   J. M. TRACY ETAL   3,113,355
LOUVERED SUN SHIELD
Filed Feb. 24, 1961   3 Sheets-Sheet 2

3,113,355
LOUVERED SUN SHIELD
John M. Tracy, Brentwood, and William R. Tracy, Richmond Heights, Mo., assignors to Architectural Products Corporation, St. Louis, Mo., a corporation of Missouri
Filed Feb. 24, 1961, Ser. No. 91,464
6 Claims. (Cl. 20—62)

This invention relates to louvered sun shields, and more particularly to louvered sun shields for windows of security institutions, such as mental and penal institutions.

Among the several objects of the invention may be noted the provision of a louvered sun shield of the class described which is so constructed as to combine with its sun-shielding function a security function, i.e., it provides an escape-proof bar arrangement on the exterior of a window; the provision of a louvered sun shield such as described which is so constructed as to be useful for architectural treatment of the exterior of a security institution; and the provision of a louvered sun shield such as described which is economical to manufacture and reliable in operation. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a view in exterior elevation of a louvered sun shield unit of this invention;

Corresponding reference characters indicate corresponding parts throughout the several views of the drawings.

Figure 5:
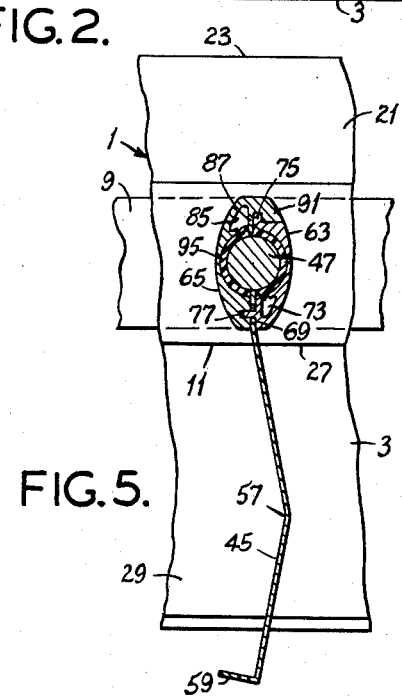
FIG. 5 is an enlarged horizontal cross section taken on line 5—5 of FIG. 1.
Figure 4:
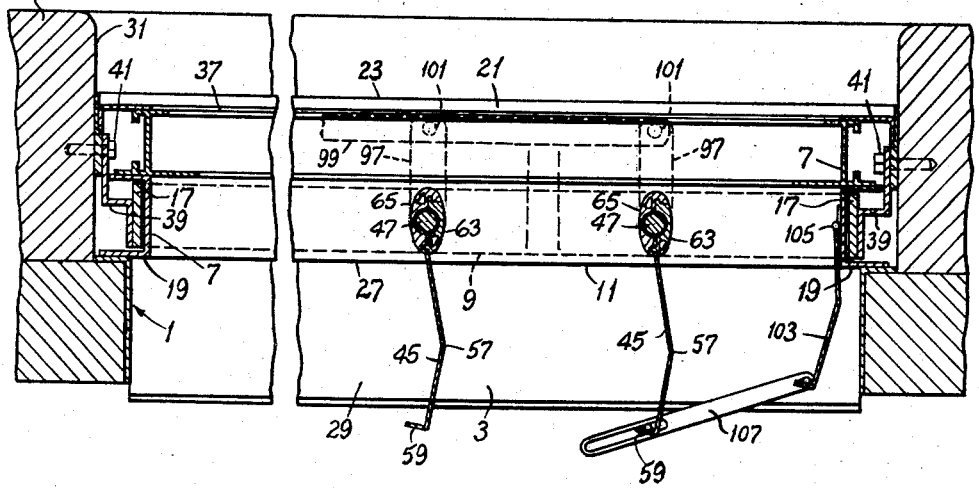
FIG. 4 is an enlarged horizontal cross section taken on line 4—4 of FIG. 1, parts being broken away to reduce the width of the view.
Figure 6:
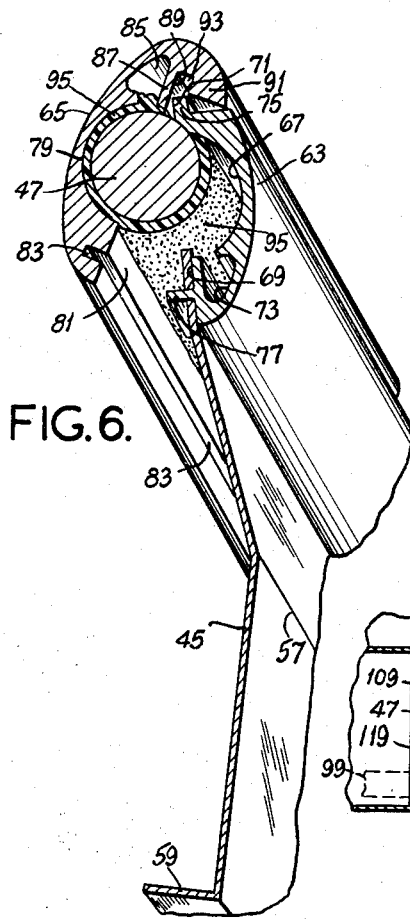
FIG. 6 is a perspective showing the mode of assembly of certain parts of the louvered sun shield unit.
Figure 7:
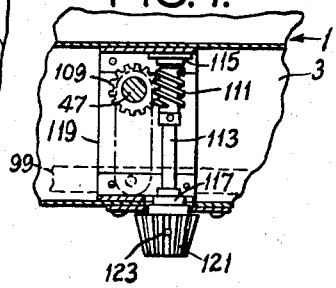
FIG. 7 is an enlarged horizontal cross-section taken on line 7—7 of FIG. 3.

Referring to FIGS. 1–4 of the drawings, a louvered sun shield unit of this invention is shown to comprise an open rectangular frame, generally designated 1, including a horizontal bottom frame member 3, a horizontal top frame member 5, and vertical side frame members each designated 7. The bottom frame member 3 comprises a so-called security bar 9 within a channel 11 (see FIGS. 3 and 5). The top frame member 5 comprises a security bar 13 within a channel 15 (see FIGS. 3 and 5). Each side frame member comprises a security bar 17 within a channel 19 (see FIG. 4). Bars 9, 13 and 17 are referred to as security bars since they are formed from an alloy (homogeneous steel, for example) having high resistance to being cut by tools and being burned, such as is customarily used for bars of security institutions. Channels 11, 15 and 19 serve as trim for the security bars 9, 13 and 17, the latter being concealed therein for architectural purposes.

Figure 1:
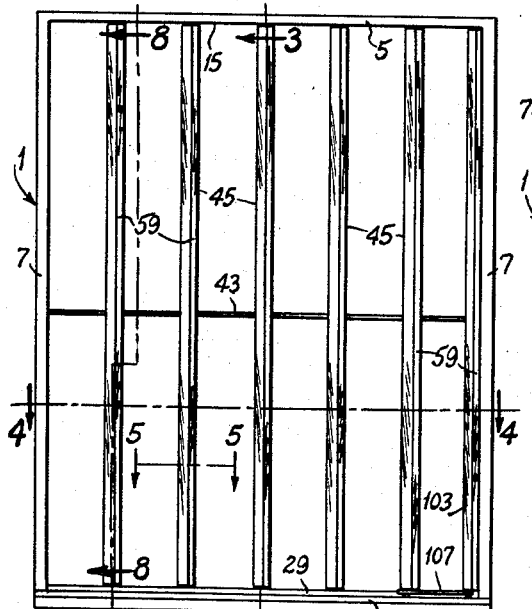
Figure 2:
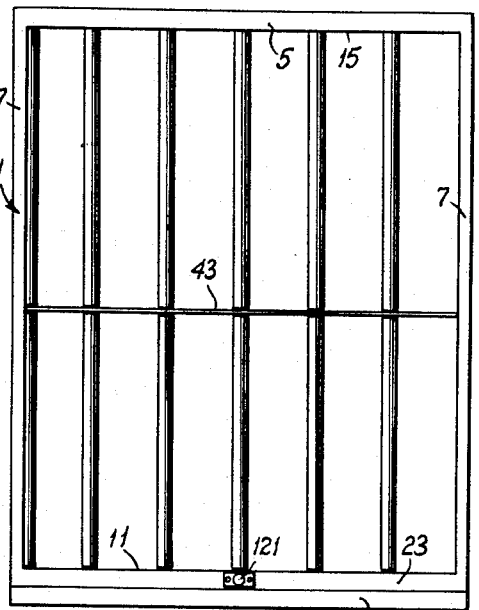
FIG. 2 is an interior elevation of the FIG. 1 unit.
Figure 3:
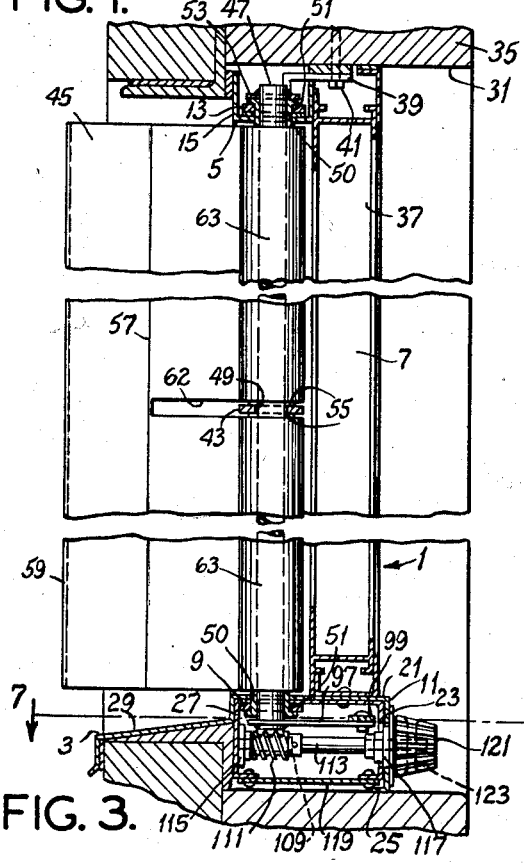
FIG. 3 is an enlarged vertical cross section taken on line 3—3 of FIG. 1, and showing the unit installed exteriorly of a window, parts being broken away to reduce the height of the view.

Channels 11, 15 and 19 may be aluminum extrusions, for example. The bottom channel 11, as shown in FIG. 3, is of special shape, having a horizontal web 21, a downwardly extending inside flange 23 with a foot 25, a downwardly extending outside flange 27 narrower than flange 23, and an inclined sill plate portion 29. The top channel 15 has its flanges extending upward (see FIGS. 3 and 5) and the side channels have their flanges extending outward (see FIG. 4). The security bars extend from end-to-end of the respective channels within the respective channels. The security bars are of flat rectangular shape in cross section and lie flatwise with respect to the webs of the respective channels. The security bars are secured together at the corners of frame 1 as by welding, and the channels 11, 15 and 19 are also suitably secured together at the corners of frame 1 as by brazing.

Figure 8:
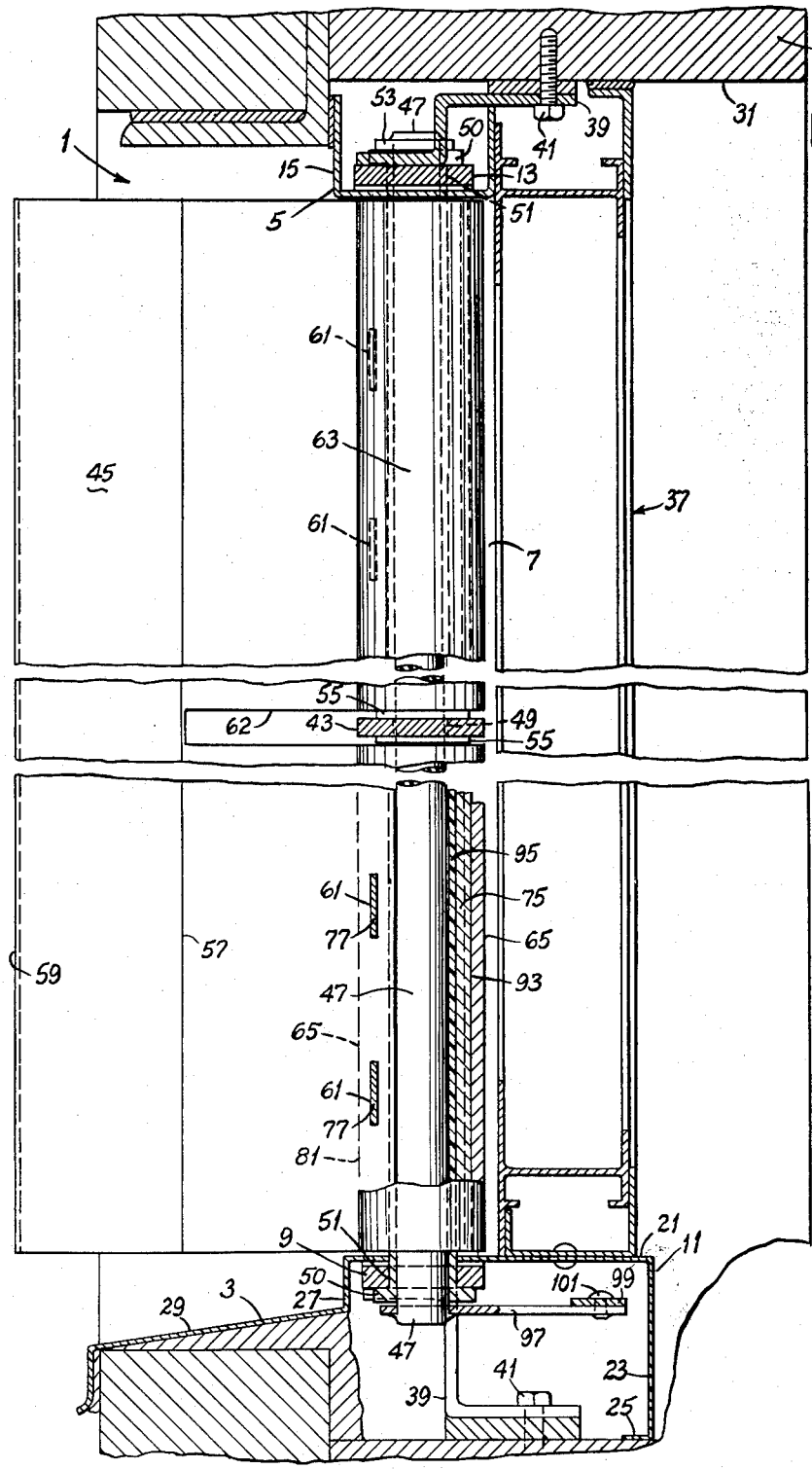
FIG. 8 is an enlarged vertical section taken on line 8—8 of FIG. 1.

The frame 1 is secured in window opening 31 in wall 35 of a building exteriorly of a window 37. The latter may be a double-hung window or any suitable other type of window. Securement of frame 1 in the window opening is effected by means of Z-section anchors such as indicated at 39 welded to security bars 9, 13 and 17 and secured to wall 35 by bolts 41 (see FIGS. 3, 4 and 8). As herein illustrated, frame 1 additionally includes an intermediate horizontal security bar 43 extending between the side security bars 17 at mid-height of the frame. The ends of bar 43 are secured as by welding to bars 17.

Louvers such as indicated at 45 are mounted in the frame on vertical louver rods 47 journalled at their upper and lower ends in the top and bottom security frame bars 13 and 11 and extend through openings 49 in the central security frame bar 43. Rods 47 are made of security stock (like bars 9, 11, 13 and 43). They are security spaced, i.e., spaced closely enough together to preclude escape of inmates. For journalling the rods 47 in bars 13 and 9, the latter have security bushings 50 secured as by welding in openings 51 therein receiving the ends of the rods. Collars 53 are secured as by welding to the rods adjacent their upper ends abutting the upper ends of the upper bushings for holding the rods against downward axial movement. Collars 55 may be secured as by welding to the rods immediately above and below the central security bar 43.

As appears in FIGS. 3–6, each louver 45 consists of a strip of sheet material (aluminum, plastic or porcelain-coated steel, for example) which may be bent as indicated at 57 and which may have a lip 59 at its outer vertical edge (though these features are not essential). Adjacent its inner vertical edge, each louver has a vertical series of vertical slits 61. Each louver also has a horizontal slot 62 through which the intermediate bar 43 extends. Each louver is secured to its respective rod 47 by means of two pairs of clamp members 63 and 65, one pair being located above and the other below the intermediate bar 43. Each clamp member consists, for example, of an aluminum extrusion. Clamp member 63 has a recess 67 of approximately semicircular cross section extending throughout its length, and flat faces 69 and 71 on opposite sides of the semicircular recess. The face 69 is offset from the face 71 by a distance equal to approximately one-half the thickness of louver 45. The semicircular recess 67 opens into a channel 73 extending throughout the length of member 63. The latter also has a lip 75 extending throughout its length. This lip projects outward from the side of member 63 having face 71. A rib is formed on face 69 during the extrusion of member 63. After extruding the member 63, portions of this rib are removed to provide a plurality of keys 77 spaced at intervals corresponding to the spacing of slits 61. Clamp member 65 has a recess 79 of approximately semicircular cross section extending throughout its length and a flat face 81 on one side of the semicircular recess. A keyway 83 for reception of keys 77 on member 63 is formed in face 81 throughout the length thereof. The semicircular recess 79 opens into a channel 85 extending throughout the length of member 65 on the side opposite the keyway. A rib 87 is provided adjacent the channel 85, the outer face 89 of the rib being offset relative to face 81 by approximately one-half the thickness of louvers 45. The member 65 also has a hook portion 91 which, in cooperation with rib 87, forms a slot 93 extending throughout the length of the member for reception of lips 75 on member 63.

An adhesive caulking material 95 having a liquid polysulfide polymer base is located between the members 63 and 65 and their respective rod 47 for bonding the members to the rod. This also serves as insulation for preventing electrolysis between the aluminum members and the steel bar. The liquid polysulfide polymer may be of the type sold under the trade designation "Thiokol" (marketed by Thiokol Corp.).

When the members 63 and 65, a rod 47 and a louver 45 are assembled, the keys 77 extend through slits 61 in louver 45 into the keyway 83 and the lip 75 is received in the slot 93 so that the members are interlocked around a rod with a louver clamped between faces 69 and 81. The channels 73 and 87 are adapted to receive excess caulking material 95 squeezed out on application of clamp members 63 and 65 to the rod 47.

An arm 97 is secured as by welding to the lower end of each louver rod 47 and extends inwardly therefrom. Arms 97 are interconnected by a link 99 extending within channel 11, each arm being pin-connected to the link as indicated at 101. Thus, upon rotation of one rod 47, all of the rods 47 will be rotated an equal amount.

Where space limitations do not permit the installation of a rod 47, clamping members 63 and 65, a louver 45 and an arm 97 at the sides 7 of the frame 1, an end louver 103 may be pivotally mounted at 105 to one of the side channels 19. This louver is attached to the adjacent louver 45 by a lost-motion link 107, so that movement of louvers 45 will be imparted to louver 103.

Means for moving the arms 97 to effect rotation of the louvers is shown to include a worm wheel 109 secured on the lower end of one of the louver rods 47. A worm 111 fixed on a shaft 113 is in mesh with the worm wheel. Shaft 113 is rotatably mounted in bearings 115 and 117. The worm and worm wheel are housed in a gear case 119 in channel 11. Shaft 113 extends inward through an opening in flange 23 of channel 11 and has a knob 121 pinned on the inner end thereof as indicated at 123.

Rotation of the knob 121 turns the worm wheel 109 and consequently the louver rod 47 to which the worm wheel is attached. The other louvers 45 are conjointly rotated by means of the respective arms 97 and link 99, and the end louver 103 is rotated by means of the lost-motion connection with the adjacent louver 45.

Figure 9:
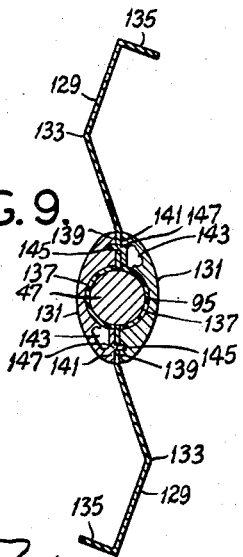
FIG. 9 is a section similar to FIG. 5 showing a modification.

A modification of the louvers 45 and clamping members 61 and 63 is shown in FIG. 9. In this arrangement, two louvers 129 are mounted on a rod 47 by means of clamping members 131 and adhesive caulking material 95. The louvers 129 are shaped similar to louvers 45 and also consist of a strip of sheet metal which may be bent as indicated at 133 and which may have a lip 135 at their outer vertical edges. Adjacent their inner vertical edges, each louver has a vertical series of vertical slits similar to slits 61 in louvers 45. Each of the clamping members 131 has a recess 137 of approximately semicircular cross section extending throughout its length, and flat coplanar faces 139 and 141 on opposite sides of the semicircular recess. The semicircular recess 137 opens into a channel 143 extending throughout the length of member 131 for the same purpose as the channels 73 and 83 in members 63 and 65, respectively, i.e., for squeeze-out of the adhesive caulking material. The face 139 of each clamping member has a keyway 145 therein and the face 141 has a plurality of keys 147 thereon.

When the members 131, a rod 47 and louvers 129 are assembled, the keys 147 of each member extend through the slits in louvers 131 into the keyway 145 of the other member. A louvered sun shield utilizing louvers 129 will be installed at a distance farther outward from the window than the louvered sun shield shown in FIGS. 1–6 so that the louver which is adjacent the window will be allowed to be freely pivoted without contacting the window. By the provision of these double-louvered units the need for an end louver 103 is eliminated.

It will be understood that the clamping members 61, 63 and 131 will perform their clamping function equally well whether the rods 47 are rotatably mounted or are fixed against rotation. Accordingly, it is contemplated that the members 61, 63 and 131 may be utilized to clamp louvers to security rods which are fixed against movement in a security bar frame.

While the frame 1 is herein described as mounted with the louvers vertical, it will be understood that a construction in which the frame is mounted with horizontally extending louvers is also contemplated.

It will thus be seen that a louvered sun shield of this invention has a dual function, i.e., it acts as a sun shield for windows and also provides an escape-proof bar arrangement on the exterior of a window, which results are accomplished by mounting louvers on rods which are fastened in a security bar frame. However, the rods and the security bars are completely concealed within the louvered sun shield construction. Thus, modern trim lines of the sun shield dominate in keeping with contemporary architectural design.

In view of the above, it will be seen that the several objects of the invention are achieved and other advantageous results attained.

As various changes could be made in the above constructions without departing from the scope of the invention, it is intended that all matter contained in the above description or shown in the accompanying drawings, shall be interpreted as illustrative and not in a limiting sense.

We claim:

1. A louvered sun shield for use in conjunction with a window of a security institution comprising a frame, two opposite members of said frame comprising security bars, security rods extending between said bars and journalled at their ends in said bars, said rods being security spaced, louvers secured to said rods, means for rotating said rods to rotate said louvers, each louver being secured to the respective rod by clamping means comprising a pair of interlocking members surrounding the rod and secured thereto, said louver being clamped between said members, said interlocking members being formed of a different metal from said rods, and said interlocking members being secured to the rods and insulated from the rods by a bonding material.

2. A louvered sun shield for use in conjunction with a window of a security institution comprising a frame, two opposite members of said frame comprising security bars, security rods extending between said bars and journalled at their ends in said bars, said rods being security spaced, louvers secured to said rods, means for rotating said rods to rotate said louvers, each louver being secured to the respective rod by clamping means comprising a pair of interlocking members surrounding the rod and secured thereto, said louver being clamped between said members, said interlocking members having recesses of approximately semicircular cross section and channels opening into said recesses, and said interlocking members being secured to the rods by a bonding material, said channels being adapted to receive overflow of bonding material created by the interlocking of said members around said rods and bonding material.

3. A louvered sun shield for use in conjunction with a window of a security institution comprising a frame, two opposite members of said frame comprising security bars, security rods extending between said bars and journalled at their ends in said bars, said rods being security spaced, louvers secured to said rods, means for rotating said rods to rotate said louvers, each louver being secured to the respective rod by clamping means comprising a pair of interlocking members surrounding the rod and secured thereto, said louver being clamped between said members, said means for rotating said rods to rotate said louvers including an arm on one end of each rod, and a link interconnecting the arms, whereby rotation of one of said rods causes conjoint rotation of all of said rods, said interlocking members being formed of a different metal from said rods, and said interlocking members being secured to the rods and insulated from the rods by a bonding material.

4. A louvered sun shield for use in conjunction with a window of a security institution comprising a frame, two opposite members of said frame comprising security bars, security rods extending between said bars and journalled at their ends in said bars, said rods being security spaced, louvers secured to said rods, means for rotating said rods to rotate said louvers, each louver being secured to the respective rod by clamping means comprising a pair of interlocking members surrounding the rod and secured thereto, said louver being clamped between said members, said means for rotating said rods to rotate said louvers including an arm on one end of each rod, and a link interconnecting the arms, whereby rotation of one of said rods causes conjoint rotation of all of said rods, said interlocking members having recesses of approximately semicircular cross section and channels opening into said recesses, and said interlocking members being secured to the rods by a bonding material, said channels being adapted to receive overflow of bonding material created by the interlocking of said members around said rods and bonding material.

5. A louvered sun shield for use in conjunction with a window of a security institution comprising a frame, two opposite members of said frame comprising security bars, security rods extending between said bars and fixed at their ends to said bars, said rods being security spaced, louvers secured to said rods, means for clamping each louver to the respective rod, said clamping means comprising a pair of interlocking members surrounding each rod and secured thereto, said louver being clamped between said members, said interlocking members being formed of a different metal from said rods, and said interlocking members being secured to the rods and insulated from the rods by a bonding material.

6. A louvered sun shield for use in conjunction with a window of a security institution comprising a frame, two opposite members of said frame comprising security bars, security rods extending between said bars and fixed at their ends to said bars, said rods being security spaced, louvers secured to said rods, and means for clamping each louver to the respective rod, said clamping means comprising a pair of interlocking members surrounding each rod and secured thereto, said louver being clamped between said members, said interlocking members having recesses of approximately semicircular cross section and channels opening into said recesses, and said interlocking members being secured to the rods by a bonding material, said channels being adapted to receive overflow of bonding material created by the interlocking of said members around said rods and bonding material.

References Cited in the file of this patent

UNITED STATES PATENTS

| | | |
|---|---|---|
| 2,073,975 | Hammar | Mar. 16, 1937 |
| 2,479,773 | Piehl | Aug. 23, 1949 |
| 2,607,452 | Hall | Aug. 19, 1952 |
| 2,739,675 | Ellis | Mar. 27, 1956 |
| 2,937,417 | Rowe | May 24, 1960 |